(12) United States Patent
Suzuki et al.

(10) Patent No.: US 11,607,990 B2
(45) Date of Patent: Mar. 21, 2023

(54) MOBILE DEVICE HAVING HEADLIGHTS AND CORRESPONDING LINEAR LIGHT EMITTERS

(71) Applicant: Panasonic Corporation, Osaka (JP)

(72) Inventors: Ryoya Suzuki, Osaka (JP); Jin Sato, Tokyo (JP); Yoshihiko Kamiya, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 17/453,035

(22) Filed: Nov. 1, 2021

(65) Prior Publication Data

US 2022/0134942 A1    May 5, 2022

(30) Foreign Application Priority Data

Nov. 5, 2020   (JP) .............................. JP2020-185035

(51) Int. Cl.
*B60Q 1/14* (2006.01)
*B60Q 1/50* (2006.01)

(52) U.S. Cl.
CPC .......... *B60Q 1/1423* (2013.01); *B60Q 1/507* (2022.05); *B60Q 2300/056* (2013.01); *B60Q 2300/32* (2013.01)

(58) Field of Classification Search
CPC ............... B60Q 1/507; B60Q 2300/30; B60Q 2300/305; B60Q 2300/31; B60Q 2300/312; B60Q 2300/314; B60Q 2300/32; B60Q 2300/322; B60Q 2300/324; B60Q 2300/33; B60Q 2300/331; B60Q 2300/332; B60Q 2300/3321; B60Q 2300/333; B60Q 2300/334; B60Q 2300/335; B60Q 2300/336; B60Q 2300/337; B60Q 2300/338
See application file for complete search history.

(56) References Cited

U.S. PATENT DOCUMENTS

| | | | |
|---|---|---|---|
| 2016/0179094 A1 | 6/2016 | Sorokin et al. | |
| 2017/0227182 A1 | 8/2017 | Hirata et al. | |
| 2019/0137069 A1 | 5/2019 | Glickman et al. | |

(Continued)

FOREIGN PATENT DOCUMENTS

| | | |
|---|---|---|
| CN | 111071143 A | 4/2020 |
| DE | 102013016905 A1 | 7/2014 |
| JP | 2007-099077 A | 4/2007 |

(Continued)

OTHER PUBLICATIONS

JP2007099077A Machine Translation Apr. 19, 2007 (Year: 2007).*
Extended European search report issued in European Patent Application No. 21206363.0 dated Apr. 7, 2022.

*Primary Examiner* — Robert J May
(74) *Attorney, Agent, or Firm* — Pearne & Gordon LLP

(57) ABSTRACT

Provided is a mobile object capable of appropriately communicating a status of the mobile object to the outside. The mobile object includes: a main body that moves; a pair of left and right headlights that are arranged on a front surface of the main body; and a pair of linear light emitters each including a light emission area which emits light linearly, the pair of linear light emitters being arranged respectively above the pair of left and right headlights.

6 Claims, 12 Drawing Sheets

(56) References Cited

U.S. PATENT DOCUMENTS

2020/0269752 A1\* 8/2020 Lee .................... B60Q 1/2615

FOREIGN PATENT DOCUMENTS

| JP | 2009-184642 A | 8/2009 |
|---|---|---|
| JP | 2014-037195 A | 2/2014 |
| JP | 2019-036512 A | 3/2019 |
| JP | 2020-059445 A | 4/2020 |
| KR | 10-1361089 B1 | 2/2014 |
| WO | 2016/051490 A1 | 4/2016 |
| WO | 2020/145189 A1 | 7/2020 |

\* cited by examiner

| CONTROL MODE | COMMUNICATION CONTENTS (STATUS) | COMMUNICATION METHOD | | |
|---|---|---|---|---|
| | | LINEAR LIGHT EMITTER | AUXILIARY LIGHT EMITTER | SPEAKER |
| | ARRIVE AT DESTINATION | MODE 2 | — | ARRIVED AT DESTINATION |
| | STANDBY | MODE 2 | — | — |
| | STARTING | MODE 1 | TURN ON (BLUE) | STARTING |
| AUTONOMOUS MOVEMENT | ON MOVE | MODE 1 | TURN ON (BLUE) | — |
| | TURN RIGHT (LEFT) | MODE 5 (6) | TURN ON (BLUE) | TURNING RIGHT (LEFT) |
| | PASSING BY TRAVELING | MODE 1 | FLASH (RED) | — |
| | PASSING BY STOP | MODE 2 | — | AFTER YOU |
| | TEMPORARY STOP | MODE 1 | TURN ON (RED) | — |

FIG. 7

| CONTROL MODE | COMMUNICATION CONTENTS (STATUS) | COMMUNICATION METHOD | | |
|---|---|---|---|---|
| | | LINEAR LIGHT EMITTER | AUXILIARY LIGHT EMITTER | SPEAKER |
| REMOTE OPERATION MOVEMENT | ON MOVE | MODE 1 | TURN ON (GREEN) | — |
| | TURN RIGHT (LEFT) | MODE 5 (6) | TURN ON (GREEN) | TURNING RIGHT (LEFT) |
| | MOVE BACKWARD | MODE 1 | — | BEEP |
| | TEMPORARY STOP | MODE 1 | TURN ON (RED) | — |
| | STARTING | MODE 2 | TURN ON (GREEN) | STARTING |
| | NOTIFICATION OF TALKING WITH REMOTE CONTROL OPERATOR | MODE 2 | FLASH (WHITE) | NOTIFICATION SOUND |
| | PRESENTATION OF TALKING AVAILABLE STATE WITH REMOTE CONTROL OPERATOR (DISPLAYING DURING CONVERSATION WITH PERSON OUTSIDE) | MODE 2 | FLASH (WHITE) | — |
| AUTONOMOUS MOVEMENT OR REMOTE OPERATION MOVEMENT | EMERGENCY STOP BUTTON IS PRESSED | MODE 4 | FLASH (RED) | SAFETY STOPPING |
| | BUMPER STOP OR SAFETY STOP DUE TO OBSTACLE DETECTION | MODE 4 | FLASH (RED) | SAFETY STOPPING |
| | CHARGING | MODE 3 | — | — |

FIG. 8

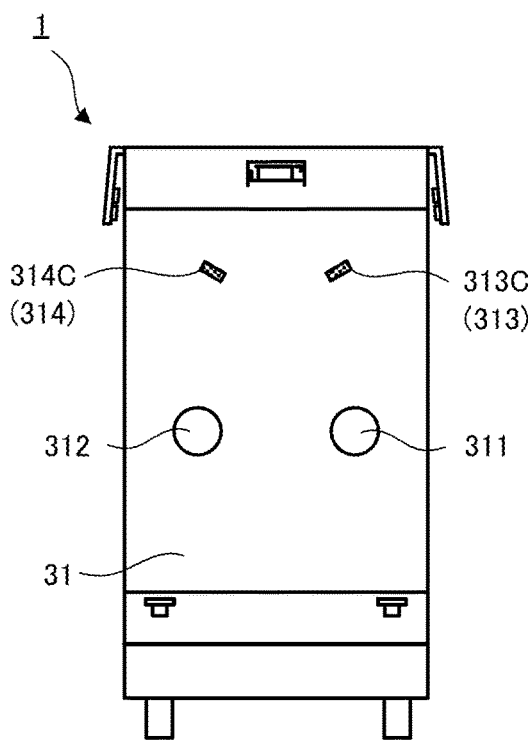
MODE 1
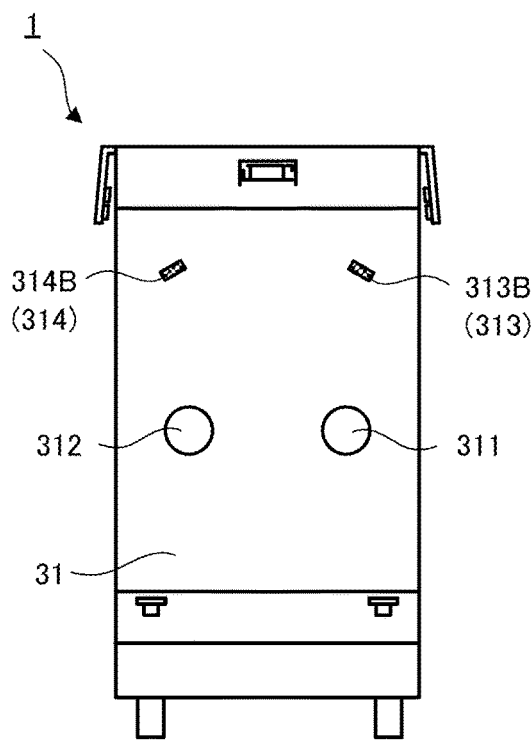
MODE 2
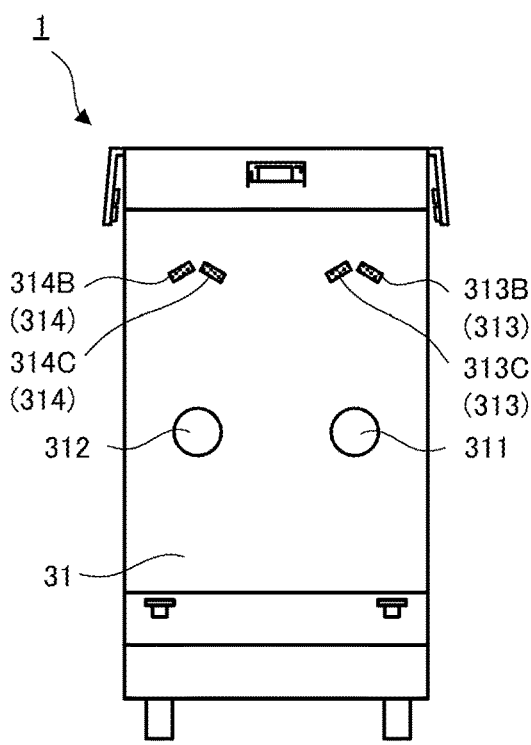
MODE 3
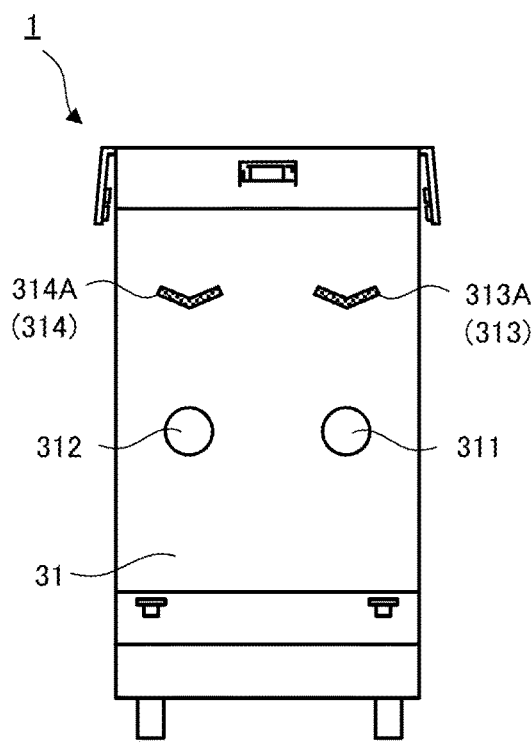
MODE 4
FIG. 9

MOBILE DEVICE HAVING HEADLIGHTS AND CORRESPONDING LINEAR LIGHT EMITTERS

CROSS REFERENCE TO RELATED APPLICATIONS

This application is entitled to (or claims) the benefit of Japanese Patent Application No. 2020-185035, filed on Nov. 5, 2020, the disclosure of which including the specification, drawings and abstract is incorporated herein by reference in its entirety.

TECHNICAL FIELD

The present disclosure relates to a mobile object.

BACKGROUND ART

Conventionally, mobile objects have been known which autonomously move, using a sensor and a map that are mounted thereon (e.g., see Patent Literature (hereinafter referred to as "PTL") 1).

In a front surface of the mobile object of PTL 1, display parts are provided. The display parts display eye-shaped images based on a moving status of the mobile object and an image captured by a surveillance camera.

CITATION LIST

Patent Literature

PTL 1
WO 2020/145189

SUMMARY OF INVENTION

Technical Problem

In the mobile object of PTL 1, the display parts are provided in a limited space other than a space for an arrangement of headlights. The eye-shaped images that are displayed in such limited space may not appropriately communicate a situation of the mobile object to a pedestrian or the like.

An object of the present disclosure is to provide a mobile object capable of appropriately communicating a status of the mobile object to the outside.

Solution to Problem

A mobile object of the present disclosure includes: a main body that moves; a pair of left and right headlights that are arranged on a front surface of the main body; and a pair of linear light emitters each including a light emission area which emits light linearly, the pair of linear light emitters being arranged respectively above the pair of left and right headlights.

Advantageous Effects of Invention

According to a mobile object of the present disclosure, it is possible to appropriately communicate a status of the mobile object to the outside.

BRIEF DESCRIPTION OF DRAWINGS

FIG. 7 illustrates, in tabular form, a relationship between a status of the mobile object and a communication method of the status according the embodiment of the present disclosure;

FIG. 8 illustrates, in tabular form, another relationship between a status of the mobile object and a communication method of the status according the embodiment of the present disclosure;

FIG. 9 is a schematic diagram illustrating light emission modes of the linear light emitters according the embodiment of the present disclosure;

DESCRIPTION OF EMBODIMENTS

Embodiment

Hereinafter, an embodiment of the present disclosure will be described in detail with reference to the accompanying drawings.

Mobile Object Configuration

Figure 1:
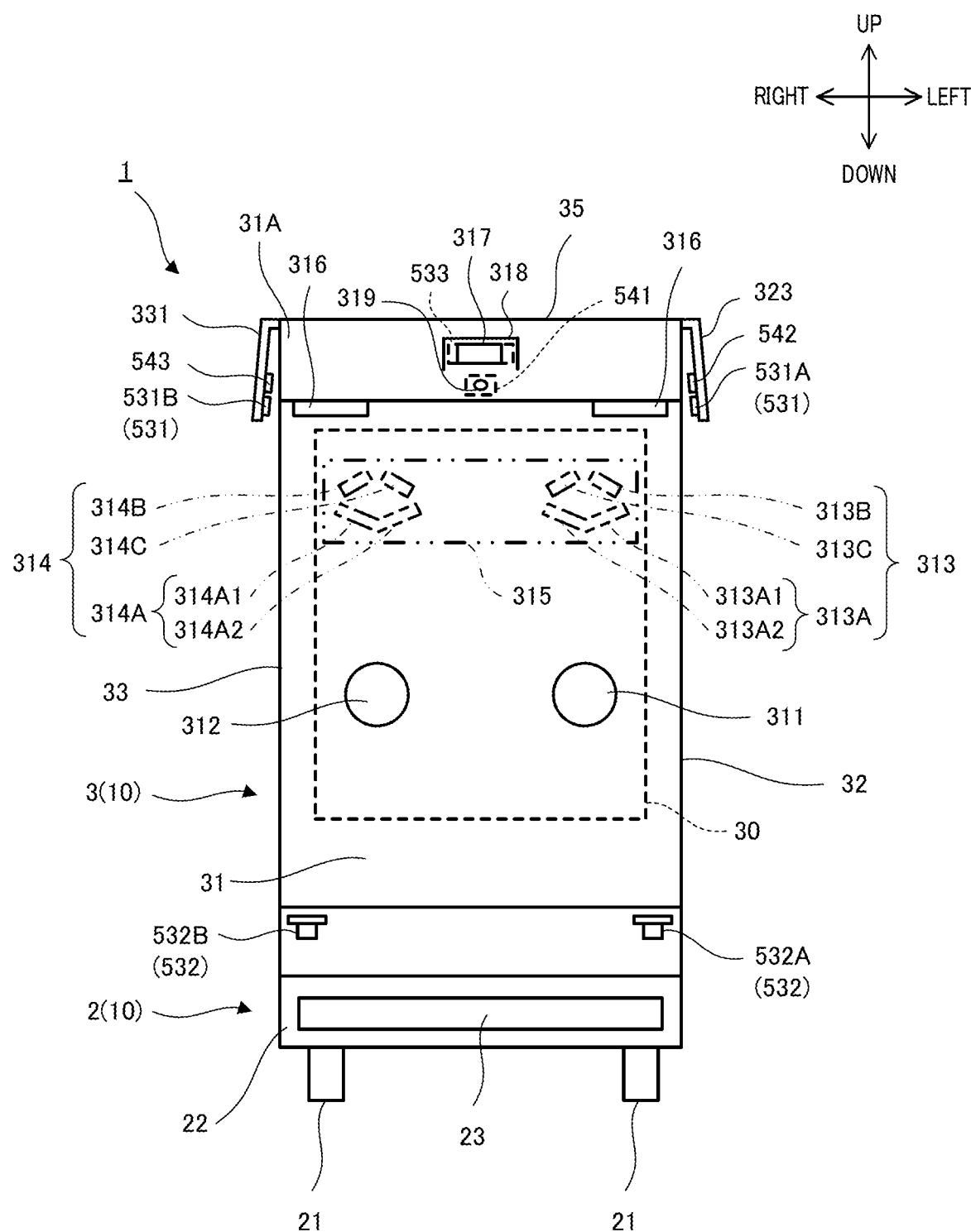
FIG. 1 is a front view of a mobile object according an embodiment of the present disclosure.
Figure 2:
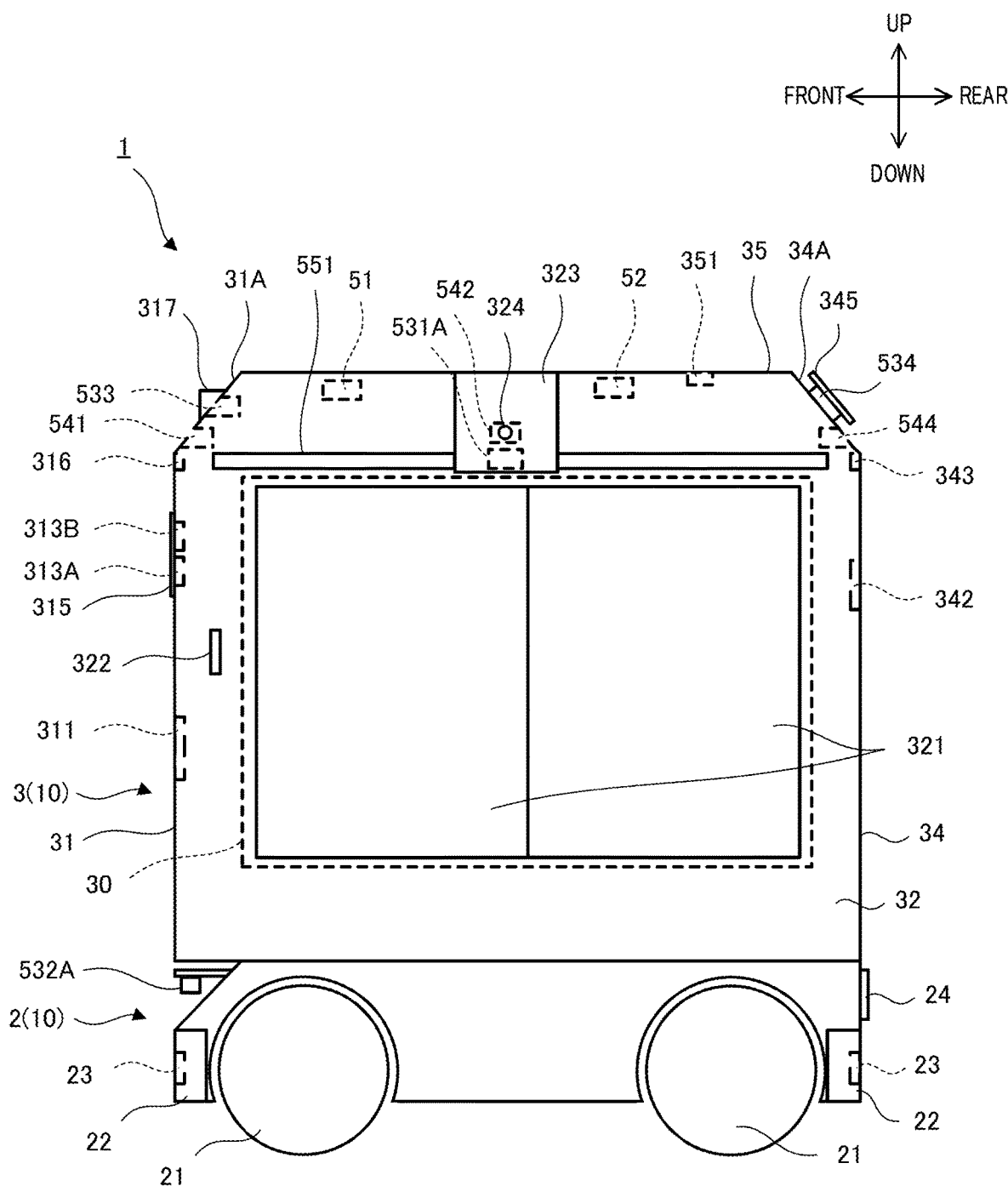
FIG. 2 is a left side view of the mobile object according the embodiment of the present disclosure.
Figure 3:
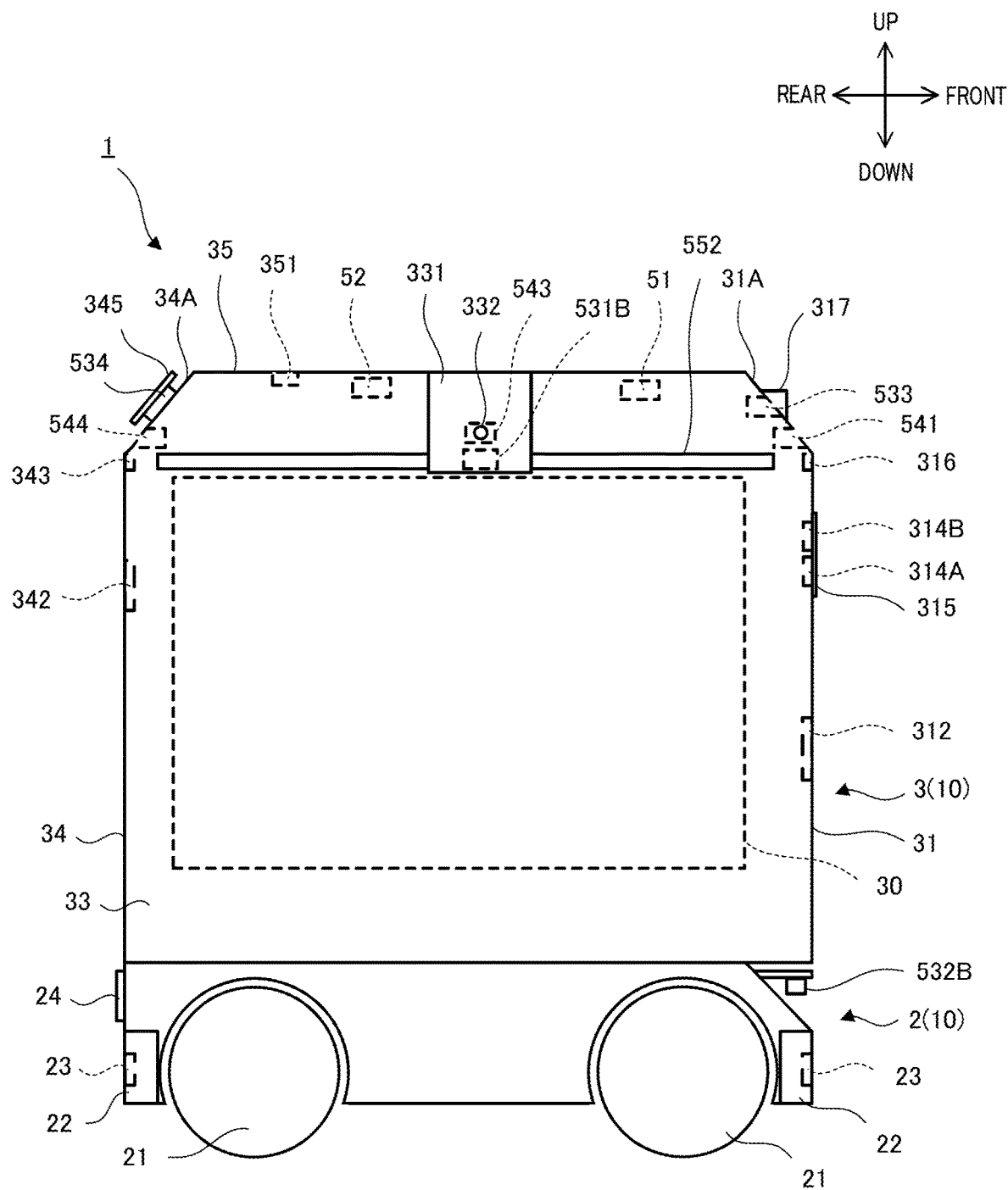
FIG. 3 is a right side view of the mobile object according the embodiment of the present disclosure.
Figure 4:
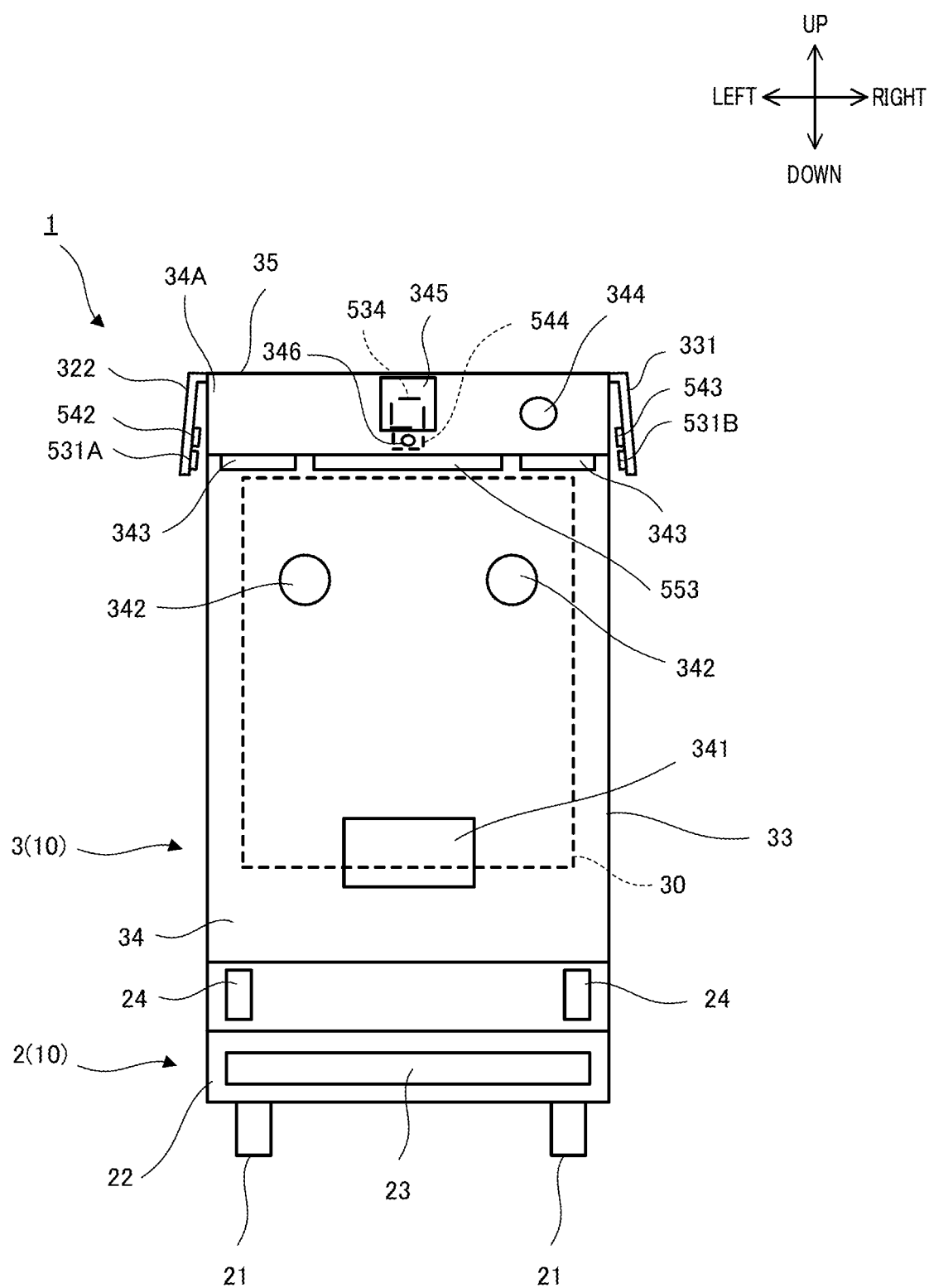
FIG. 4 is a back view of the mobile object according the embodiment of the present disclosure.
Figure 5:
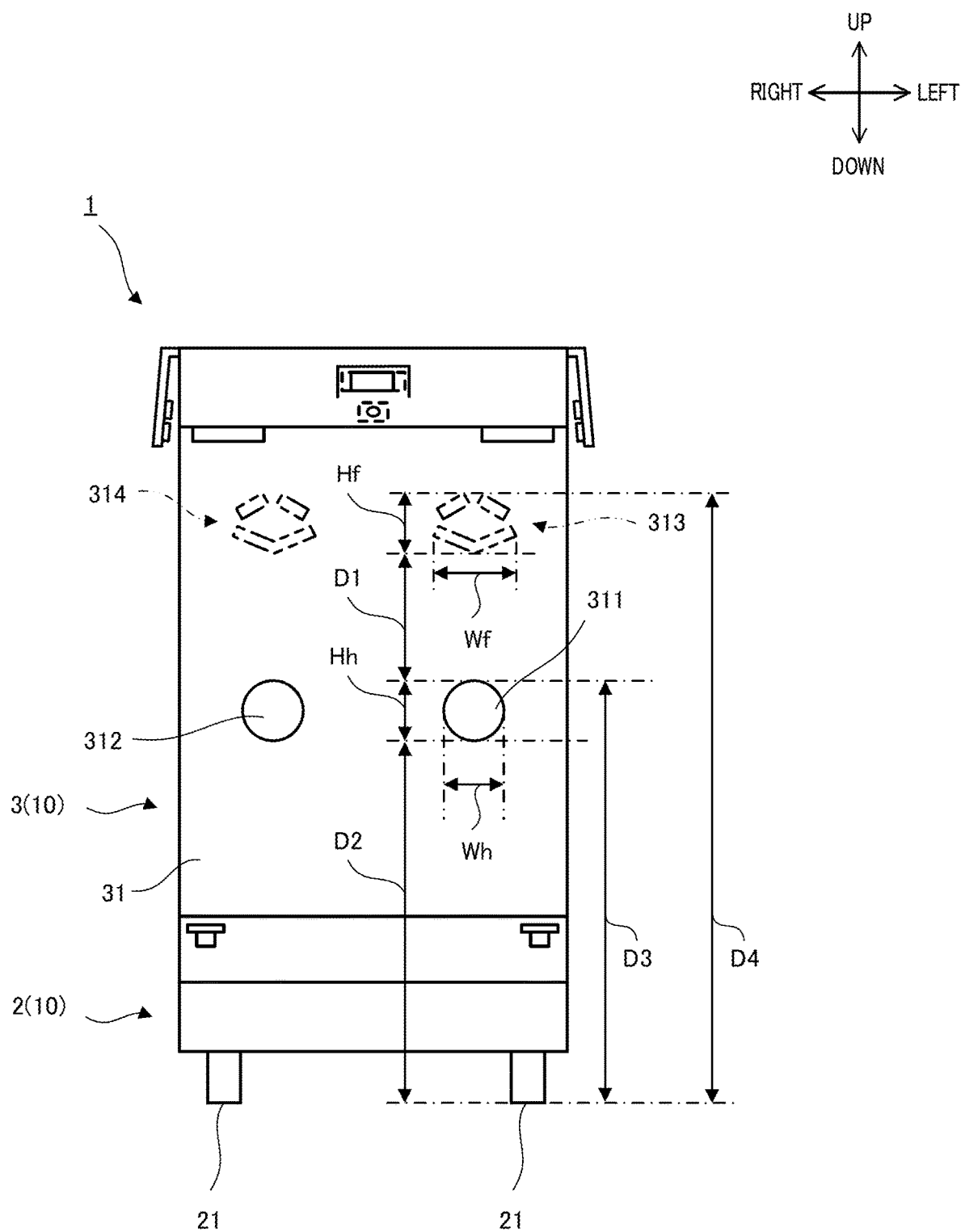
FIG. 5 is a schematic diagram illustrating a positional relationship between a headlight and a linear light emitter of the mobile object according the embodiment of the present disclosure.
Figure 6:
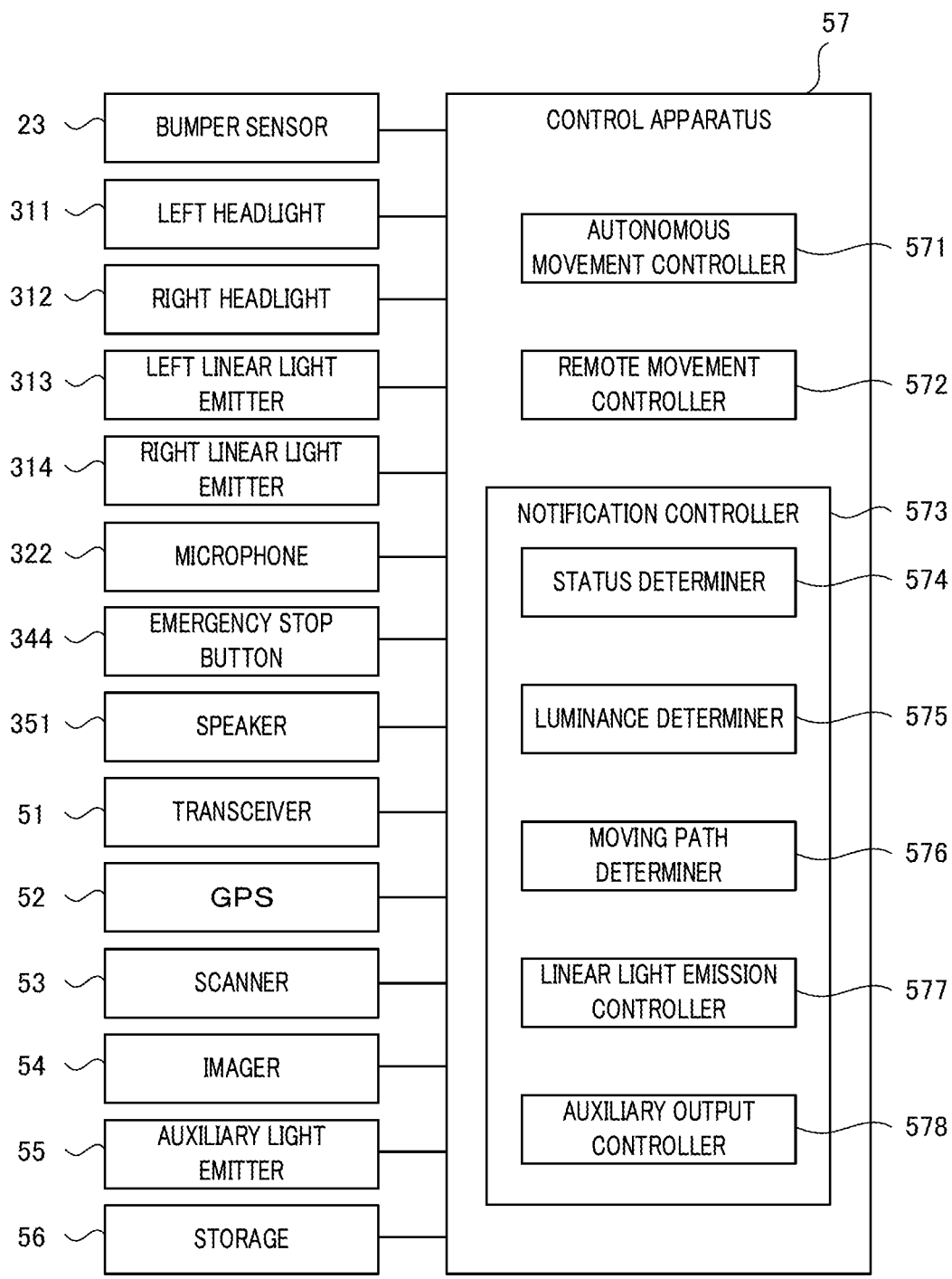
FIG. 6 is a block diagram illustrating a control system of the mobile object according the embodiment of the present disclosure.
Figure 10:
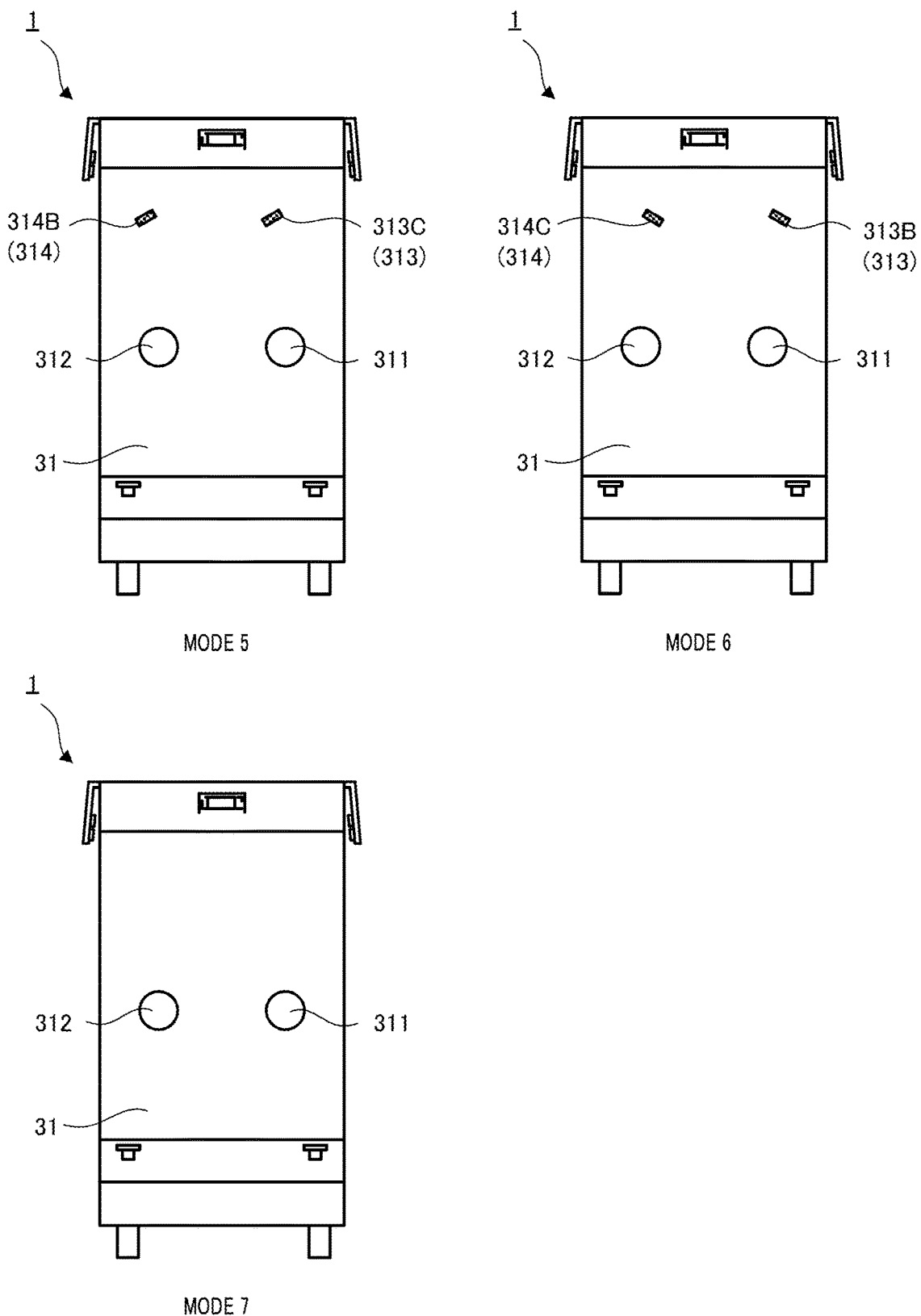
FIG. 10 is a schematic diagram illustrating other light emission modes of the linear light emitters according the embodiment of the present disclosure.

A configuration of a mobile object will be described. In the present embodiment, as an example of the mobile object, a description will be given of a transport robot for transporting an article outdoors, indoors, in a facility, private land, or the like, but the mobile object may be, for example, a vacuum cleaner, a mobile object for various kinds of sensing, a communication robot for communicating with a person, an automobile or train for transporting a person outdoors, indoors, in a facility, private land, or the like, and a cart which is moved by a person pushing. FIG. 1 is a front view of the mobile object. FIG. 2 is a left side view of the mobile object. FIG. 3 is a right side view of the mobile object. FIG. 4 is a back view of the mobile object. FIG. 5 is a schematic diagram illustrating a positional relationship between a headlight and a linear light emitter of the mobile object. FIG. 6 is a block diagram illustrating a control system of the mobile object. FIGS. 7 and 8 each illustrate, in tabular form, a relationship between a status of the mobile object and a communication method of the status. FIGS. 9 and 10 are schematic diagrams illustrating light emission modes of the linear light emitters.

First, a configuration of mobile object 1 will be described. Note that, as illustrated in FIGS. 1 to 5, the directions of front-rear, up-down, and left-right are defined with reference to mobile object 1 as viewed from a rear side. Mobile object 1 includes base body 2 and main body 3. Base body 2 and main body 3 form vehicle body 10.

Base body 2 includes four wheels 21. Wheels 21 rotate independently from each other with driving of a drive motor (not illustrated) installed inside base body 2. At front and rear portions of base body 2, bumpers 22 are arranged, respectively. On front and rear bumpers 22, bumper sensors 23 are arranged, respectively. When an object comes into contact with bumper sensor 23, bumper sensor 23 outputs a detection signal indicating that the object has come into contact with bumper 23.

A pair of left and right reflection boards 24 are arranged above rear bumper 22. A battery (not illustrated) is placed in base body 2.

Main body 3 is formed in a rectangular cuboid shape. An interior space of main body 3 constitutes housing 30 for housing an article. Main body 3 is placed on an upper surface of base body 2.

Front surface 31 of main body 3 is, as illustrated in FIG. 1, formed in a substantially rectangular shape vertically long in front view.

On front surface 31, left headlight 311 and right headlight 312 are arranged. Left and right headlights (hereinafter, may be referred to as "headlights 311 and 312") are preferably have the same shape. Headlights 311 and 312 are preferably round or elliptical, which are suggestive of eyes, but are not limited to these shapes. Head lights 311 and 312 are preferably arranged at the same height positions on a lower side relative to a center of front surface 31 in a vertical direction.

On front surface 31, left linear light emitter 313 and right linear light emitter 314 are arranged. Left and right linear light emitters 313 and 314 (hereinafter, may be referred to as "linear light emitters 313 and 314") each include a light emission area that emits light linearly. Linear light emitters 313 and 314 are preferably have the same shape. Linear light emitters 313 and 314 are preferably arranged almost directly above headlights 311 and 312, respectively, so as to be suggestive of eyebrows. Linear light emitters 313 and 314 are preferably arranged at the same height positions on an upper side relative to a center of front surface 31 in the vertical direction (hereinafter may be referred to as "upper area"). Linear light emitters 313 and 314 are preferably arranged on an upper side relative to a center of the upper area of front surface 31 in a vertical direction.

Left linear light emitter 313 includes first left division linear light emitter 313A, second left division linear light emitter 313B, and third left division linear light emitter 313C. Right linear light emitter 314 includes first right division linear light emitter 314A, second right division linear light emitter 314B, and third right division linear light emitter 314C which are almost linearly symmetrical around a center line in the left-right direction of front surface 31 with respect to, respectively, first left division linear light emitter 313A, second left division linear light emitter 313B, and third left division linear light emitter 313C. Hereinafter, first left division linear light emitter 313A, second left division linear light emitter 313B, and third left division linear light emitter 313C will be described in detail whereas first right division linear light emitter 314A, second right division linear light emitter 314B, and third right division linear light emitter 314C will be briefly described.

First left division linear light emitter 313A, second left division linear light emitter 313B, and third left division linear light emitter 313C are different from each other in at least one of the length, the width, and the angle with respect to a horizontal plane of the light emission area.

First left division linear light emitter 313A includes left inclined portion 313A1 and right inclined portion 313A2. Left inclined portion 313A1 and right inclined portion 313A2 may be arranged in a partly connected state or may be arranged separately within a range not disturbing visibility. Left inclined portion 313A1 is formed in a straight line shape, which is inclined such that a left end thereof is positioned above a right end in front view (extending obliquely upper leftward). Right inclined portion 313A2 is formed in a straight line shape, which is inclined such that a right end thereof is positioned above a left end in front view (extending obliquely upper rightward). The left end of right inclined portion 313A2 is connected to the right end of left inclined portion 313A1. An inclination angle of right inclined portion 313A2 with respect to the horizontal plane is preferably the same as an inclination angle of left inclined portion 313A1 with respect to the horizontal plane. The inclination angles of right inclined portion 313A2 and left inclined portion 313A1 with respect to the horizontal plane is preferably a sharp angle. Right inclined portion 313A2 is preferably formed in the same length as left inclined portion 313A1. The right end of right inclined portion 313A2 is preferably located at the same height position as the left end of left inclined portion 313A1.

Second left division linear light emitter 313B is placed above left inclined portion 313A1. Second left division linear light emitter 313B is formed in a straight line extending obliquely upper rightward. An inclination angle of second left division linear light emitter 313B with respect to the horizontal plane is preferably a sharp angle.

Third left division linear light emitter 313C is placed at a position away from second left division linear light emitter 313B above right inclined portion 313A2. Third left division linear light emitter 313C is formed in a straight line extending obliquely upper leftward. An inclination angle of third left division linear light emitter 313C with respect to the horizontal plane is preferably a sharp angle, and is more preferably the same as the inclination angle of second left division linear light emitter 313B. Third left division linear light emitter 313C is preferably formed in the same length as second left division linear light emitter 313B. A left end of third left division linear light emitter 313C is located at the same height position as a right end of second left division linear light emitter 313B whereas a right end of third left division linear light emitter 313C is preferably located at the same height position as the left end of second left division linear light emitter 313B. Incidentally, second left division linear light emitter 313B and third left division linear light emitter 313C may be arranged in a partly connected state.

First right division linear light emitter 314A includes right inclined portion 314A1 and left inclined portion 314A2. Second right division linear light emitter 314B is placed above right inclined portion 314A1. Third right division linear light emitter 314C is placed above left inclined portion 314A2.

Note that, first left division linear light emitter 313A, second left division linear light emitter 313B, third left division linear light emitter 313C, first right division linear light emitter 314A, second right division linear light emitter 314B, and third right division linear light emitter 314C may be configured of light sources each having a light emission area with a corresponding one of the shapes described above, or may be configured to have a light emission area with a corresponding one of the shapes described above by arranging a plurality of light sources. Meanwhile, examples of the light sources include a Light Emitting Diode (LED), an organic Electro-Luminescence (EL), a halogen lamp, and a High Intensity Discharge (HiD) lamp.

On front surface 31, cover member 315 that covers linear light emitters 313 and 314 is placed. Cover member 315 is composed of a material that transmits light from linear light emitters 313 and 314. Cover member 315 is colored in the same color as at least the periphery of linear light emitters 313 and 314 of the front portion 31 and has a function to make linear light emitters 313 and 314 invisible from outside when linear light emitters 313 and 314 do not emit light. Cover member 315 is composed of, for example, a plastic film. Note that, with the two cover members, left linear light emitter 313 and right linear light emitter 314 may be covered, respectively, or with the six cover members, first left division linear light emitter 313A, second left division linear light emitter 313B, third left division linear light emitter 313C, first right division linear light emitter 314A, second right division linear light emitter 314B, and third right division linear light emitter 314C may be covered, respectively.

On front surface 31, a pair of left and right front turn signals 316 are arranged. Left and right front turn signals 316 are respectively provided above linear light emitters 313 and 314. An area above front turn signals 316 in front surface 31 (hereinafter referred to as "front inclined area") 31A is inclined rearward.

Here, description will be given of a preferable positional relationship between headlights 311 and 312 and linear light emitters 313 and 314 in mobile object 1.

As illustrated in FIG. 5, when a width dimension of headlight 311 (or 312) is referred to as Wh (hereinafter may be also referred to as "headlight width dimension Wh"), a width dimension Wf of linear light emitter 313 (or 314) is preferably not less than 1.0 times but not more than 1.5 times of headlight width dimension Wh.

When a height dimension of headlight 311 (or 312) is referred to as Hh (hereinafter may be also referred to as "headlight height dimension Hh"), distance D1 from an upper end of headlight 311 (or 312) to a lower end of linear light emitter 313 (or 314) is not less than 0.5 times of headlight height dimension Hh but not more than 500 mm. In a case where distance D1 is less than 0.5 times of headlight height dimension Hh, undesirable phenomena as described in (A) and (B) below may occur.

(A) When linear light emitter 313 (or 314) does not emit light, light from headlight 311 (or 312) makes outlines of linear light emitter 313 (or 314) visible.

(B) When headlight 311 (or 312) is turned on, the visibility of linear light emitter 313 (or 314) is reduced.

Further, in a case where distance D1 is greater than 500 mm, headlight 311 (or 312) and linear light emitter 313 (or 314) will be too far from each other to be recognized as an eye and an eyebrow, respectively.

Distance D2 from the ground (lower end of wheel 21) to a lower end of headlight 311 (or 312) is preferably not less than 500 mm. In a case where distance D2 is less than 500 mm, an irradiation function of headlight 311 (or 312) may not be maintained.

Distance D3 from the ground to the upper end of headlight 311 (or 312) is preferably a value satisfying the following Expression 1 when a height dimension of linear light emitter 313 (or 314) is referred to as Hf. In a case where distance D3 does not satisfy Expression 1, light from headlight 311 (or 312) may have an adverse effect on view fields of surrounding people and/or a driver of an automobile, or undesirable phenomena as described in (A) and (B) above may occur.

$$D3 \leq 1000 \text{ mm} - (D1 + Hf) \quad \text{Expression 1}$$

Distance D4 from the ground to an upper end of linear light emitter 313 (or 314) is preferably not more than 1000 mm. In a case where distance D4 is greater than 1000 mm, vehicle body 10 may be too high, and the outline of linear light emitter 313 (or 314) may be made visible when linear light emitter 313 (or 314) does not emit light because arrangement of linear light emitter 313 (or 314) in a peripheral edge of vehicle body 10 makes it difficult to ensure a space for sufficiently covering linear light emitter 313 (or 314) with cover member 315.

As illustrated in FIG. 2, storage door 321 is placed on left surface 32 of main body 3. Opening storage door 321 allows putting in and taking out an article to/from housing 30. Storage door 321 may be either a turning or sliding door. Microphone 322 is placed forward of storage door 321 in left surface 32.

Left protrusion 323 is provided at a central position at the upper end of left surface 32 in a front-rear direction. Left protrusion 323 includes a base extending leftward and a tip extending obliquely downward from a leading end of the base.

As illustrated in FIG. 3, on right surface 33 of main body 3, right protrusion 331 is provided which has the same shape as left protrusion 323.

As illustrated in FIG. 4, number plate 341 is placed on rear surface 34 of main body 3. A pair of left and right brake lamps 342 are arranged above number plate 341. A pair of left and right rear turn signals 343 are arranged on rear surface 34. An area above rear turn signals 343 in rear surface 34 (hereinafter referred to as "rear inclined area") 34A is inclined forward.

Emergency stop button 344 is placed on a right side of rear inclined area 34A. Pressing emergency stop button 344 stops mobile object 1 in emergency.

As illustrated in FIGS. 2 and 3, speaker 351 is placed on a rear side of upper surface 35 of main body 3.

Moreover, as illustrated in FIG. 6, vehicle body 10 includes transceiver 51, Global Positioning System (GPS) 52, scanner 53, imager 54, auxiliary light emitter 55, storage 56, and control apparatus 57.

As illustrated in FIGS. 3 and 4, transceiver 51 and GPS 52 are arranged on an upper side of an inside of main body 3.

Scanner 53 scans around mobile object 1 and outputs a scan result. As illustrated in FIGS. 1 to 4, scanner 53 includes first scanner 531, second scanner 532, third scanner 533, and fourth scanner 534.

First scanner 531 scans a moving path of mobile object 1. First scanner 531 includes lower left scanner 531A and lower right scanner 531B. Lower left scanner 531A is placed on a surface that faces left surface 32 at the leading end of left protrusion 323. Lower right scanner 531B is placed on a surface that faces right surface 33 at the leading end of right protrusion 331. Lower left scanner 531A and lower right scanner 531B are composed of, for example, a two-dimensional Light Detection And Ranging (LiDAR), and outputs the scan result. Lower left scanner 531A scans a two-dimensional scan range that is inclined with respect to a vertical plane on the left of mobile object 1. Lower right scanner 531B scans a two-dimensional scan range that is inclined with respect to a vertical plane on the right of mobile object 1.

Second scanner 532 scans above the moving path of mobile object 1. Second scanner 532 includes front left scanner 532A and front right scanner 532B. Front left scanner 532A and front right scanner 532B (hereinafter may be referred to as "front scanners 532A and 532B") are arranged at left and right ends on a front surface of base body 2, respectively. Front scanners 532A and 532B are composed of, for example, the two-dimensional LiDAR. Front scanners 532A and 532B scan a two-dimensional scan range parallel to a horizontal plane in front and side of mobile object 1, and outputs a scan result.

Third scanner 533 is placed on the inside of main body 3 in front inclined area 31A. At a position that faces third scanner 533 in front inclined area 31A, first opening 317 for exposing third scanner 533 to outside is formed. Front inclined area 31A is provided with eaves part 318 protruding forward from upper and lateral sides of first opening 317. Eaves part 318 prevents third scanner 533 from being wet with rain or snow. Third scanner 533 is composed of, for example, a three-dimensional LiDAR. Third scanner 533 scans a three-dimensional scan range which is ahead of mobile object 1, and outputs a scan result.

Fourth scanner 534 is placed on rear inclined area 34A. Fourth scanner 534 is composed of, for example, the two-dimensional LiDAR, scans a two-dimensional scan range inclined with respect to a horizontal plane above and behind mobile object 1, and outputs a scan result. On an upper surface of fourth scanner 534, cover 345 is placed to prevent fourth scanner 534 from being wet with rain or snow.

Imager 54 includes front imager 541, left imager 542, right imager 543, and rear imager 544.

Front imager 541 is placed on the inside of main body 3 in front inclined area 31A and below third scanner 533. In front inclined area 31A, second opening 319 for exposing a lens of front imager 541 to outside is formed.

Left imager 542 is placed above lower left scanner 531A at the leading end of left protrusion 323. In left protrusion 323, third opening 324 for exposing a lens of left imager 542 to outside is formed.

Right imager 543 is placed above lower right scanner 531B at the leading end of right protrusion 331. At the leading end of right protrusion 331, fourth opening 332 for exposing a lens of right imager 543 to outside is formed.

Rear imager 544 is placed on the inside of main body 3 in rear inclined area 34A and below fourth scanner 534. In rear inclined area 34A, fifth opening 346 for exposing a lens of rear imager 544 to outside is formed.

Auxiliary light emitter 55 includes left-side-surface light emitter 551, right-side-surface light emitter 552, and rear-surface light emitter 553. Left-side-surface light emitter 551 is placed on an upper edge portion of left surface 32 in main body 3. Right-side-surface light emitter 552 is placed on an upper edge portion of right surface 33 in main body 3. Rear-surface light emitter 553 is placed on a central part of an upper edge portion of rear surface 34 in main body 3. Left-side-surface light emitter 551, right-side-surface light emitter 552, and rear-surface light emitter 553 are formed so as to extend linearly in a horizontal direction.

Storage 56 stores various kinds of information required to move mobile object 1. Examples of the information stored in storage 56 include: map information, moving path information; a program for functioning control apparatus 57; information on emission patterns of linear light emitters 313 and 314 and auxiliary light emitter 55; and a pronunciation pattern of speaker 351.

Control apparatus 57 performs various processes by a microcomputer having a processor executing a program stored in storage 56. Control apparatus 57 is electrically connected to bumper sensor 23, left head light 311, right head light 312, left linear light emitter 313, right linear light emitter 314, microphone 322, emergency stop button 344, speaker 351, transceiver 51, GPS 52, scanner 53, imager 54, auxiliary light emitter 55, and storage 56. Control apparatus 57 includes autonomous movement controller 571, remote movement controller 572, and notification controller 573.

Autonomous movement controller 571 causes mobile object 1 to autonomously move. For example, autonomous movement controller 571 estimates the self-position of mobile object 1 based on position coordinates of mobile object 1 obtained from GPS 52, a distance to an object around mobile object 1 based on the scan result of scanner 53, and the like. Autonomous movement controller 571 causes mobile object 1 to autonomously move to a destination based on self-positions regularly estimated, the map information and the moving path information stored in storage 56, and the like. Autonomous movement controller 571 stops mobile object 1 when determining, based on the scan result of scanner 53, that an obstacle is present on the moving path of mobile object 1.

Remote movement controller 572 controls mobile object 1 based on an operation of a remote control device by a remote control operator. Remote movement controller 572 transmits an image captured by imager 54 and information on an outside sound of mobile object 1 input to microphone 322 to the remote control device via transceiver 51. When transceiver 51 receives a remote control signal from the remote control device, remote movement controller 572 controls starting, moving, right-left turning, and stopping of mobile object 1 based on the remote control signal.

Autonomous movement controller 571 and remote movement controller 572 cause mobile object 1 to stop when emergency stop button 344 is pressed or bumper sensor 23 senses contact while mobile object 1 is moving.

In addition, control apparatus 57 turns on head lights 311 and 312 while mobile object 1 is moving or turned on.

Notification controller 573 controls emission states of linear light emitters 313 and 314 and auxiliary light emitter 55, and a sounding state of speaker 351. Notification controller 573 includes status determiner 574, luminance determiner 575, moving path determiner 576, linear light emission controller 577, and auxiliary output controller 578.

Status determiner 574 determines a status of mobile object 1. Examples of the statuses of mobile object 1 to be determined by status determiner 574 include, as illustrated in columns of "communication contents" in tables of FIGS. 7 and 8, but are not limited to, statuses relating to autonomous movement, remote operation movement, starting, stop, right-left turning, arrival, standby, self-position, communication with a remote control operator, and the like.

Luminance determiner 575 determines luminance around mobile object 1. Luminance determiner 575 may determine the luminance based on time information obtained from an internal clock of mobile object 1 and/or via a network. After determining whether mobile object 1 is moving in a tunnel based on the map information and the self-position, luminance determiner 575 may determine the luminance based on the determination result. Luminance determiner 575 may determine the luminance based on an image captured by imager 54. In a case where an illuminance sensor is placed in mobile object 1, luminance determiner 575 may determine the luminance based on a detection result of the illuminance sensor. A method for determining the luminance around mobile object 1 by luminance determiner 575 is not limited to these described above.

Moving path determiner 576 determines whether a moving path of mobile object 1 is either a roadway or sidewalk (type of moving path). Moving path determiner 576 may determine the type of the moving path based on the map information and the self-position. Moving path determiner 576 may determine the type of the moving path based on at least one of the scan result of scanner 53 and the image captured by imager 54. In a case where a device that transmits a signal indicating the type of the moving path is installed near a building or road, moving path determiner 576 may determine the type of the moving path based on the signal.

Linear light emission controller 577 controls light emission states of linear light emitters 313 and 314 based on the determination results of status determiner 574, luminance determiner 575, and moving path determiner 576, and the information stored in storage 56. Linear light emission controller 577 sets, based on the determination result of status determiner 574, light emission modes of linear light emitters 313 and 314 as illustrated in the columns of "linear light emitters" in the tables of FIGS. 7 and 8. In each light emission mode, linear light emission controller 577 causes linear light emitters 313 and 314 to emit light as illustrated in FIGS. 9 and 10. In FIGS. 9 and 10, linear light emitters 313 and 314 emitting light are illustrated while linear light emitters 313 and 314 not emitting light are not illustrated. The relationships between light emission modes and causing division linear light emitters to emit light are illustrated below. Note that, the light emission modes of linear light emitters 313 and 314 are not limited to the following. In the present embodiment, as illustrated in the table of FIGS. 7 and 8, although a case is not included where linear light emitters 313 and 314 are set to "mode 7," but they may be set to "mode 7" when in any status illustrated in the tables of FIGS. 7 and 8 or may be set to "mode 7" when in a predetermined status not illustrated in the tables of FIGS. 7 and 8.

(Mode 1)

Third left division linear light emitter 313C and third division linear light emitter 314C (Mode 2)

Second left division linear light emitter 313B and second right division linear light emitter 314B (Mode 3)

Second left division linear light emitter 313B, third left division linear light emitter 313C, second right division linear light emitter 314B and third right division linear light emitter 314C (Mode 4)

First left division linear light emitter 313A and first right division linear light emitter 314A (Mode 5)

Third left division linear light emitter 313C and second right division linear light emitter 314B (Mode 6)

Second left division linear light emitter 313B and third right division linear light emitter 314C (Mode 7)

None of division linear light emitters emit light

By causing linear light emitters 313 and 314 to emit light in modes 1 to 6, the following effects can be achieved.

(Mode 1)

An effect can be achieved which communicates that mobile object 1 is under working (e.g., moving) by presenting a motivated facial expression.

(Mode 2)

An effect can be achieved which communicates that mobile object 1 is not working (e.g., in standby or stopped) by presenting a mild facial expression.

(Mode 3)

An effect can be achieved which communicates that a status of mobile object 1 is favorable (e.g., during charging) by presenting a smile.

(Mode 4)

An effect can be achieved which communicates that a status of mobile object 1 is unfavorable (e.g., emergency) by presenting an annoying facial expression.

(Mode 5)

An effect can be achieved which communicates that a moving direction of mobile object 1 is to the right by presenting a facial expression facing to the right.

(Mode 6)

An effect can be achieved which communicates that a moving direction of mobile object 1 is to the left by presenting a facial expression facing to the left.

Headlights 311 and 312 and linear light emitters 313 and 314 are arranged so as to be suggestive of eyes and eyebrows, respectively. As illustrated in FIG. 9 or FIG. 10, when headlights 311 and 312 and linear light emitters 313 and 314 emit light, for people around mobile object 1, mobile object 1 appears to change its facial expression in accordance with a status of mobile object 1.

Linear light emission controller 577 controls, based on the determination result of luminance determiner 575 and moving path determiner 576, the amount of light of linear light emitters 313 and 314 as follows, for example. Note that, in the following, the phrase "the surroundings of the mobile object is bright" means a state, such as in the morning and/or daytime, which is brighter than a threshold state, and the phrase "the surroundings of the mobile object is dark" means a state, such as at night and/or in a tunnel, which is darker than the threshold state. The amount of light of linear light emitters 313 and 314 is not limited to the following and may be set to be adjustable according to a surrounding environment, for example. Moreover, in the following, a light amount of "second brightest" and a light amount of "third brightest" may be the same.

The surroundings of the mobile object are bright while the movement path is a roadway: Most brightest The surroundings of the mobile object are dark while the movement path is a roadway: Third brightest.

The surroundings of the mobile object are bright while the movement path is a sidewalk: Second brightest The surroundings of the mobile object are dark while the movement path is a sidewalk: Fourth brightest Auxiliary output controller 578, based on the determination result of status determiner 574 and the information stored in storage 56, controls an emission state of auxiliary light emitter 55 and controls a sounding state of speaker 351 as respectively illustrated in columns the "auxiliary light emitter" and the "speaker" in the tables of FIGS. 7 and 8. Note that, control contents for auxiliary light emitter 55 and speaker 351 are not limited to these illustrated in FIGS. 7 and 8.

Operation of Mobile Object

Figure 11:
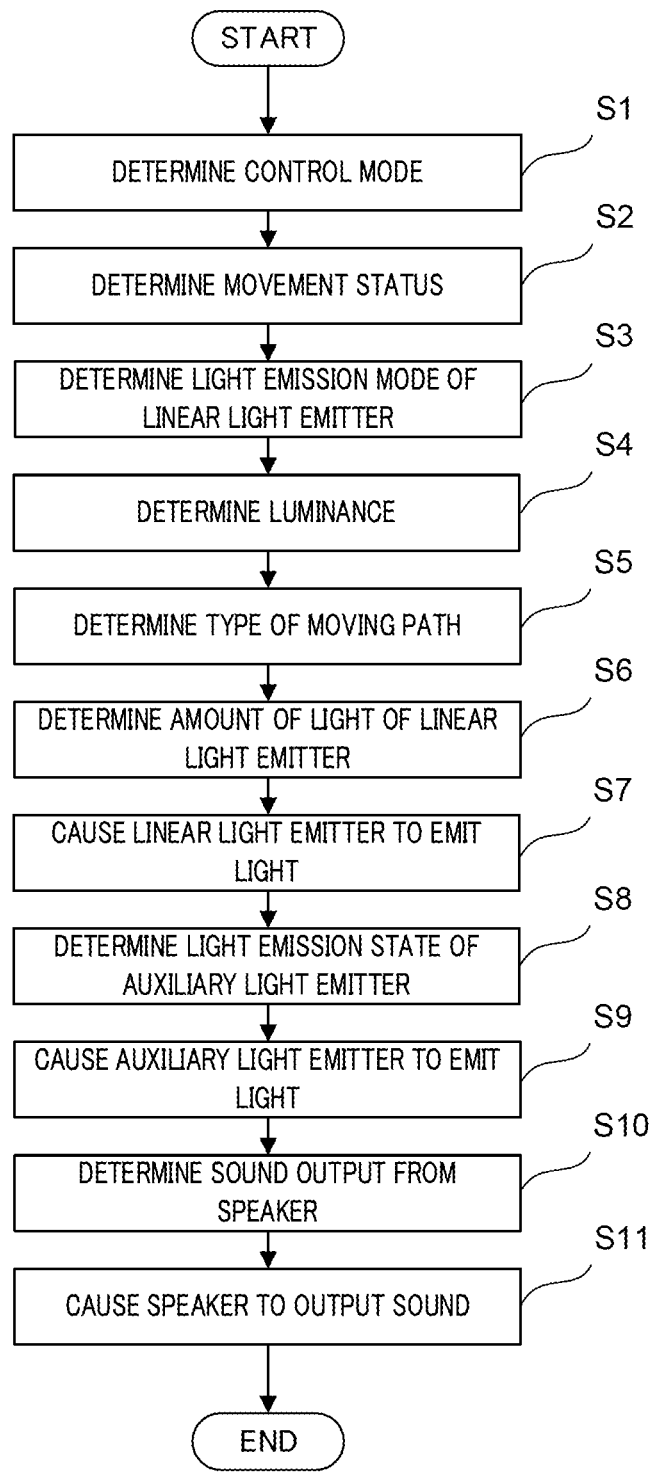
FIG. 11 is a flowchart illustrating an operation example of the mobile object according the embodiment of the present disclosure.
Figure 12:
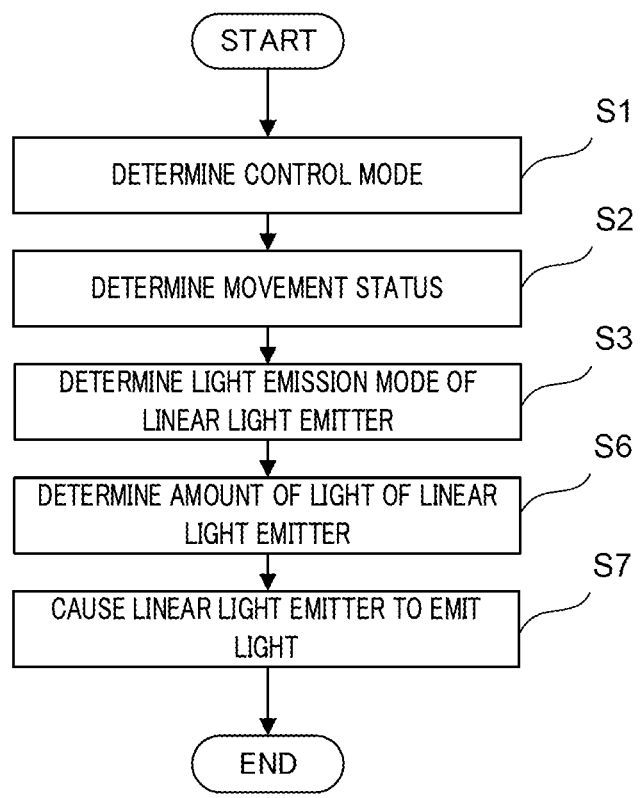
FIG. 12 is a flowchart illustrating another operation example of the mobile object according the embodiment of the present disclosure.

Next, an operation of mobile object 1 will be described. FIG. 11 is a flowchart illustrating an example of the operation of the mobile object. FIG. 12 is a flowchart illustrating another example of the operation of the mobile object.

Control apparatus 57 causes mobile object 1 to move based on the control of autonomous movement controller 571 or remote movement controller 572.

During the control by autonomous movement controller 571 or remote movement controller 572, as illustrated in FIG. 11, status determiner 574 of notification controller 573 determines a control mode of mobile object 1 (step S1). That is, status determiner 574 determines that mobile object 1 is autonomously moving or is remotely controlled as illustrated in columns of the "control mode" in the tables of FIGS. 7 and 8. Status determiner 574 determines a movement status of mobile object 1 as illustrated in columns of the "communication contents" in the tables of FIGS. 7 and 8 (step S2). Linear light emission controller 577 determines a light emission mode of linear light emitters 313 and 314, as illustrated in FIG. 7 or FIG. 8, based on the determination results in step S1 and step S2 in status determiner 574 (step S3).

Luminance determiner 575 determines a luminance around mobile object 1 (step S4). Moving path determiner 576 determines a type of the moving path of mobile object 1 (step S5). Linear light emission controller 577 determines the amount of light of linear light emitters 313 and 314, as illustrated in FIG. 7 or 8, based on the determination result in step S4 in luminance determiner 575 and the determination result in step S5 in moving path determination unit 576 (step S6). Incidentally, as illustrated in FIG. 12, by setting the amount of light of linear light emitters 313 and 314 to be constant in advance, the amount of light can be determined while omitting steps S4 and S5, and thus the processing may be simplified.

Linear light emission controller 577 causes linear light emitters 313 and 314 to emit light, as illustrated in FIG. 9 or FIG. 10, based on the light emission mode determined in step S3 and the amount of light determined in step S6 (step S7).

Auxiliary output controller 578 determines a light emission state of auxiliary light emitter 55, as illustrated in FIG. 7 or FIG. 8, based on the determination result in step S1 and step S2 in status determiner 574 (step S8). Auxiliary output controller 578 causes auxiliary light emitter 55 to emit light under the light emission state determined in step S8 (step S9). Incidentally, by setting the amount of light of auxiliary light emitter 55 to be constant in advance, the amount of light can be determined without the determination results in step S1 and step S2, and thus the processing may be simplified. In addition, as illustrated in FIG. 12, steps S8 and S9 may be omitted so as not to cause auxiliary light emitter 55 to emit light.

Auxiliary output controller 578 determines a sound to be output from speaker 351, as illustrated in FIG. 7 or FIG. 8, based on the determination results in step S1 and step S2 in status determiner 574 (step S10). Auxiliary output controller 578, outputs the sound with a content determined in step S10 from speaker 351 (step S11). Incidentally, as illustrated in FIG. 12, steps S10 and S11 may be omitted so as not to cause speaker 351 to output a sound.

By the above described processing of steps S1 to S11, as illustrated in FIGS. 7 and 8, the light emission states of linear light emitters 313 and 314 and auxiliary light emitter 55, and the output state of the sound from speaker 351 are controlled. Notification controller 573 executes the processing of steps S1 to S11 periodically until the movement of mobile object 1 is completed or until the power of mobile object 1 is turned off.

Operational Effect of Embodiment

While turning on headlights 311 and 312, mobile object 1 causes linear light emitters 313 and 314 to emit light in different patterns in accordance with the status of mobile object 1. At this time, for people around mobile object 1, the mobile object 1 appears to change its facial expression according to the status of mobile object 1. Mobile object 1 of the present embodiment can present people around mobile object 1 of a facial expression by using headlights 311 and 312, which are conventionally installed, and light linear light emitters 313 and 314. This allows communication of a status in a large area as compared with the configuration of PTL 1 that communicates the status only by the eye-shaped image displayed above the headlights. Accordingly, mobile object 1 is capable of appropriately communicating a status or calling attention, even to a person away from mobile object 1.

Left linear light emitter 313 includes first, second, third division linear light emitters 313A, 313B, and 313C. Right linear light emitter 314 includes first, second, third right division linear light emitters 314A, 314B, and 314C. As illustrated in FIGS. 9 and 10, linear light emission controller 577 selectively causes first, second, third left division linear light emitters 313A, 313B, and 313C and first, second, third right division linear light emitters 314A, 314B, and 314C to emit light. As a result, mobile object 1 can appropriately communicate a status alone by selectively causing first, second, third left division linear light emitters 313A, 313B, and 313C and first, second, third right division linear light emitters 314A, 314B, and 314C to emit light.

On front surface 31, cover member 315 for covering linear light emitters 313 and 314 is placed. Cover member 315 has a function of transmitting light from linear light emitters 313 as well as making linear light emitters 313 and 314 invisible from the outside when linear light emitters 313 and 314 do not emit light. Thus, a status that mobile object 1 want to communicate can be appropriately recognized by surrounding people when linear light emitters 313 and 314 do not emit light and/or only a part of linear light emitters 313 and 314 do not emit light is caused to emit light.

Mobile object 1 is equipped with linear light emission controller 577 that controls the light emission states of linear light emitters 313 and 314 based on the determination result of the status of mobile object 1 in status determiner 574. This enables switching the light emission states of linear light emitters 313 and 314 in accordance with the status of mobile object 1 without performing a remote operation. Thus, mobile object 1 can appropriately communicate the status or call attention. In addition, it is possible to prevent a situation where light coming from surroundings, such as the headlights of an automobile traveling around or sunlight and reflected by linear light emitters 313 and 314 makes linear light emitters 313 and 314 which do not emit light appear to emit light. Consequently, it is possible to prevent the facial expression from appearing differently from the facial expression to be expressed.

Linear light emission controller 577 controls the amount of light of linear light emitters 313 and 314 based on the determination result of the luminance around mobile object 1 in luminance determiner 575. Thus, the light emission states of linear light emitters 313 and 314 can be made easily visible for surrounding people in accordance with the luminance, and a status can be appropriately communicated.

Linear light emission controller 577 controls the amount of light of linear light emitters 313 and 314 based on the determination result of the type of the moving path in moving path determiner 576. When mobile object 1 moves on a roadway, the amount of light of linear light emitters 313 and 314 is preferably increased so that the light from the headlights of other automobiles does not make it difficult to see the light from linear light emitters 313 and 314. In the present embodiment, when mobile object 1 moves the roadway, the amount of light is increased, and thus, it is possible to appropriately call attention to a surrounding mobile object. On the other hand, when mobile object 1 moves a sidewalk, the amount of light of linear light emitters 313 and 314 is preferably reduced because an excessively bright light of linear light emitters 313 and 314 may make a facial expression of mobile object 1 unrecognizable or may be perceived as an obstacle. In the present embodiment, when mobile object 1 moves the sidewalk, the amount of light is reduced, and thus, it is possible to prevent deterioration of visibility of a facial expression of mobile object 1 by a pedestrian.

MODIFICATION OF EMBODIMENT

It is needless to say that the present disclosure is not limited to the above-described embodiment, and various modifications may be derived from the above-described embodiment without departing from the spirit thereof.

For example, at least any one of the following may extend in a direction parallel to the horizontal plane or may be curved: first left division linear light emitter 313A, second left division linear light emitter 313B, third left division linear light emitter 313C, first right division linear light emitter 314A, second right division linear light emitter 314B, and third right division linear light emitter 314C. Linear light emitters 313 and 314 may be each configured of one light emitter (any one of first to third left linear light emitters 313A to 313C or any one of first to third right linear light emitters 314A to 314C) that emits light linearly. Linear light emitters 313 and 314 may be each configured of four or more division linear light emitters. Linear light emitters 313 and 314 may be each configured of a display device having a circular or polygonal screen, and a portion of the display device may be caused to emit light linearly.

For example, in a private land, light emission states of headlights 311 and 312 may be controlled together with light emission states of linear light emitters 313 and 314 according to a status of mobile object 1. In one example, left headlight 311 or right headlight 312 may be flashed to present surrounding people of a wink. In addition, for example, similar to linear light emitters 313 and 314, the amount of light of headlights 311 and 312 may be increased or reduced depending on a surrounding situation as described above. Moreover, an irradiation angle may be changed according to a status of mobile object 1.

At least one of the light emission states and the amount of light of linear light emitters 313 and 314 may be controlled based on an operation of remote control apparatus by a remote control operator. The amount of light of linear light emitters 313 and 314 need not be controlled based on at least one of the type of ambient luminance or the type of moving path.

Linear light emitters 313 and 314 may be visible to surrounding people even when linear light emitters 313 and 314 do not emit light, without placing cover member 315 on front surface 31.

INDUSTRIAL APPLICABILITY

The present disclosure can be applied to a mobile object.

REFERENCE SIGNS LIST

1 Mobile object
2 Base body
3 Main body
10 Vehicle body
21 Wheel
22 Bumper
23 Bumper sensor
24 Reflection board
30 Housing
31 Front surface
31A Front inclined area
32 Left surface
33 Right surface
34 Rear surface
34A Rear inclined area
35 Upper surface
51 Transceiver
52 GPS
53 Scanner
54 Imager
55 Auxiliary light emitter
56 Storage
57 Control apparatus
311 Left headlight
312 Right headlight
313 Left linear light emitter
313A First left division linear light emitter
313A1 Left inclined portion
313A2 Right inclined portion
313B Second left division linear light emitter
313C Third left division linear light emitter
314 Right linear light emitter
314A First right linear light emitter
314A1 Right inclined portion
314A2 Left inclined portion
314B Second right linear light emitter
314C Third right linear light emitter
315 Cover member
316 Front turn signal
317 First opening
318 Eaves part
319 Second opening
321 Storage door
322 Microphone
323 Left protrusion
324 Third opening
331 Right protrusion
332 Fourth opening
341 Number plate
342 Brake lamp
343 Rear turn signal
344 Emergency stop button
345 Cover
346 Fifth opening
351 Speaker
531 First scanner
531A Lower left scanner
531B Lower right scanner
532 Second scanner
533 Third scanner
534 Fourth scanner
532A Front left scanner
532B Front right scanner
541 Font imager
542 Left imager
543 Right imager
544 Rear imager
551 Left-side-surface light emitter
552 Right-side-surface light emitter
553 Rear-surface light emitter
571 Autonomous movement controller 572 Remote movement controller
573 Notification controller
574 Status determiner
575 Luminance determiner
576 Moving path determiner
577 Linear light emission controller
578 Auxiliary output controller

The invention claimed is:

1. A mobile object, comprising:
    a main body that moves;
    a pair of left and right headlights that are arranged on a front surface of the main body;
    a plurality of linear light emitters each including a light emission area which emits light linearly, the plurality of linear light emitters being arranged respectively above the pair of left and right headlights, and the plurality of linear light emitters being different from each other in at least one of a length, a width, and/or an angle with respect to a horizontal plane of the light emission area;
    a status determiner that determines a status of the main body; and
    a linear light emission controller that controls a light emission state of at least one of the plurality of linear light emitters based on a determination result of the status determiner.

2. The mobile object according to claim 1, further comprising a cover member for covering at least one of the plurality of linear light emitters, wherein the cover member has a function of transmitting light from at least one of the plurality of linear light emitters as well as making at least one of the plurality of linear light emitters invisible from an outside of the main body when the at least one of the plurality of linear light emitters does not emit light.

3. The mobile object according to claim 1, further comprising a luminance determiner that determines a luminance around the main body, wherein the linear light emission controller controls an amount of light of the at least one of the plurality of linear light emitters based on a determination result of the luminance determiner.

4. The mobile object according to claim 1, further comprising a moving path determiner that determines whether a moving path of the main body is either a roadway or a sidewalk, wherein
    the linear light emission controller controls the amount of light of the at least one of the plurality of linear light emitters based on a determination result of the moving path determiner.

5. The mobile object according to claim 1, further comprising an autonomous movement controller that causes the mobile object to autonomously move.

6. A mobile object, comprising:
    a main body that moves,
    a pair of left and right headlights that are arranged on a front surface of the main body,
    a pair of linear light emitters each including a light emission area which emits light linearly, the pair of linear light emitters being arranged respectively above the pair of left and right headlights;
    a moving path determiner that determines whether a moving path of the main body is either a roadway or a sidewalk; and
    a linear light emission controller controls the amount of light of the at least one of the pair of linear light emitters based on a determination result of the moving path determiner.

* * * * *